United States Patent [19]

Walser

[11] Patent Number: 4,842,181

[45] Date of Patent: Jun. 27, 1989

[54] APPARATUS FOR LOADING FOOD FOR ALIGNMENT WITH FOOD STICKS

[75] Inventor: Glenn E. Walser, Duncanville, Tex.

[73] Assignee: Automated Food Systems, Inc., Duncanville, Tex.

[21] Appl. No.: 74,081

[22] Filed: Jul. 16, 1987

[51] Int. Cl.⁴ .......................... B21J 15/28; B27F 7/17
[52] U.S. Cl. ......................................... 227/3; 99/352; 99/420; 99/441; 227/101; 227/103
[58] Field of Search ................ 99/403, 352, 404, 353, 99/416, 419, 420, 494, 325, 441, 443; 426/304, 134; 227/2, 5, 3, 99, 100, 101, 103, 120, 45, 48

[56] References Cited

U.S. PATENT DOCUMENTS

| | | | |
|---|---|---|---|
| 2,733,439 | 2/1956 | Pikal | 227/2 |
| 3,221,673 | 12/1965 | Shelly | 425/126.2 |
| 4,379,795 | 4/1983 | Walser | 426/304 |
| 4,430,930 | 2/1984 | Walser | 99/331 |

Primary Examiner—Timothy F. Simone
Attorney, Agent, or Firm—Richards, Harris, Medlock & Andrews

[57] ABSTRACT

An apparatus for loading food for alignment with food sticks is provided. A food bin stores the food to be processed. The bin is filled with food which is gravity fed into J-shaped sections of a food conveyor belt. Concurrently, a stick conveyor system carries and aligns food sticks with the food. When the correct number of food items is aligned with the food sticks, the sticks are automatically inserted into the food items.

11 Claims, 4 Drawing Sheets

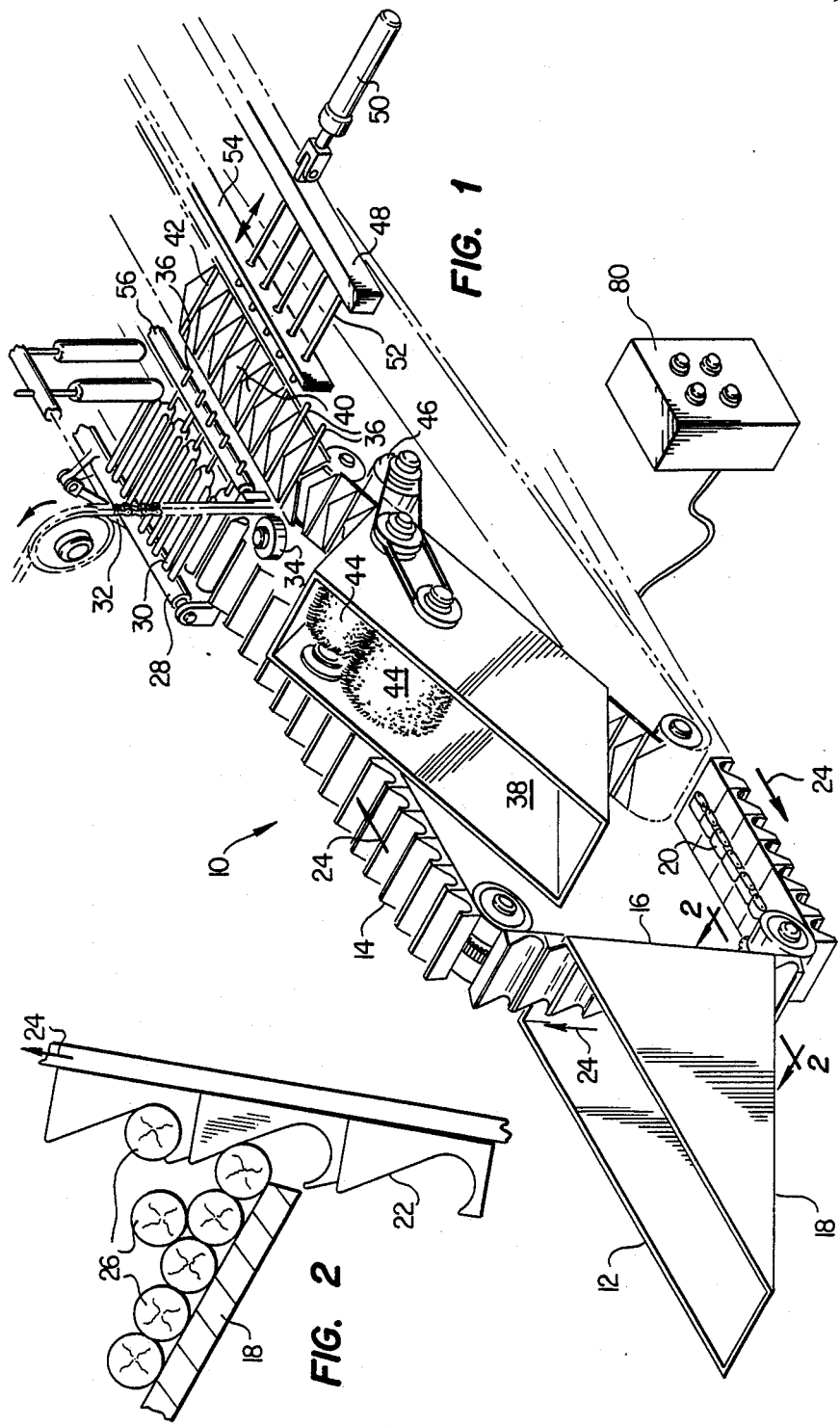

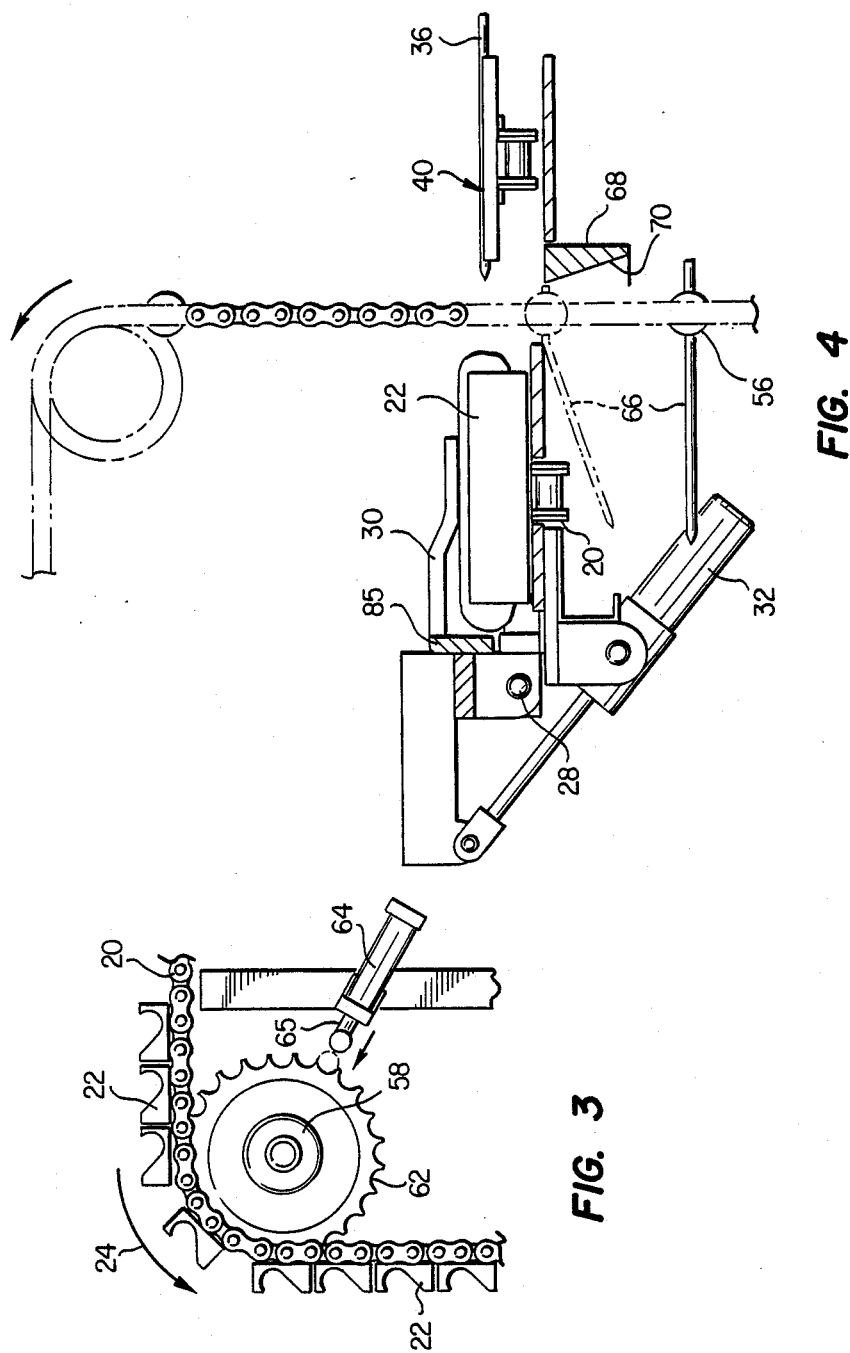

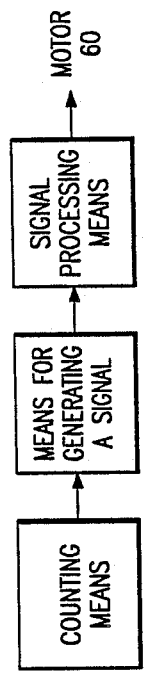
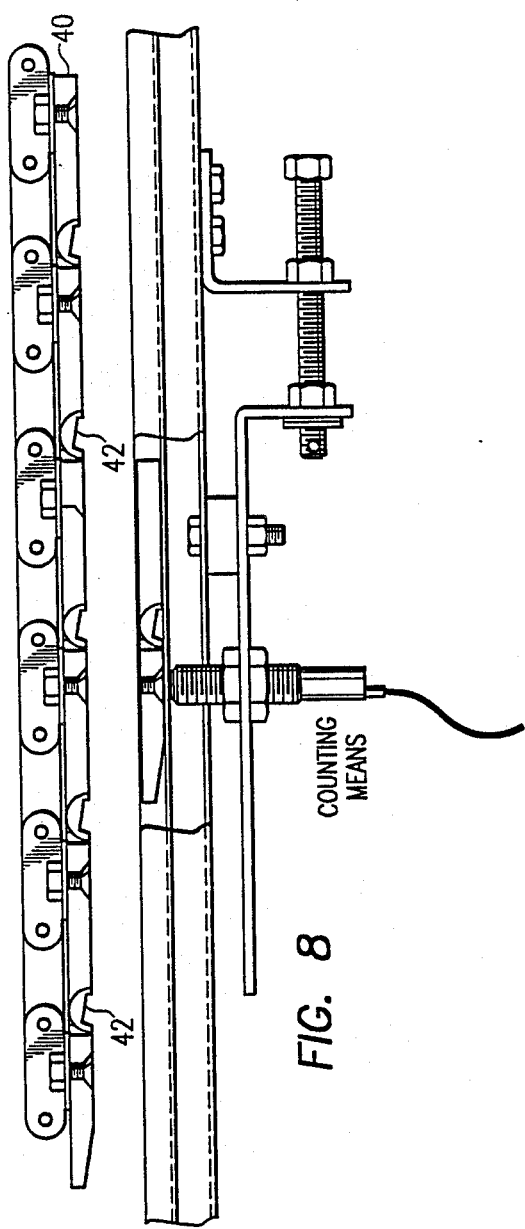

APPARATUS FOR LOADING FOOD FOR ALIGNMENT WITH FOOD STICKS

TECHNICAL FIELD

This invention relates to food processing equipment and more particularly to machines for sorting and aligning food and food sticks so that the stick may be inserted into the food.

BACKGROUND OF THE INVENTION

Prior to the present invention it has been necessary to manually load food products so that they may have a stick either automatically or manually inserted into them. This has typically been done by using several personnel who must rapidly and accurately place the food items onto a carrying or loading device. These operators must become highly skilled through experience before they are able to perform satisfactorily. The job is very labor intensive. The job also presents some safety concerns since the operators must work quickly in and around moving mechanical equipment.

An example of a manual operation for loading hot dogs or food articles prior to automatic stick insertion can be seen in U.S. Pat. No. 4,379,795, April 12, 1983, and U.S. Pat. No. 4,430,930, Feb. 14, 1984, both to Walser and both commonly assigned to Automated Food Systems, Inc. In these patents, food articles are manually loaded into food grippers. The grippers then hold the food in position for automatic stick insertion. Once the sticks are inserted the grippers release the food and the food is conveyed to the next position for further processing.

The main disadvantage of the manual loading in these two patents is that it often results in empty grippers. Since an operator is required to manually load a number of food items in a relatively confined space and in a relatively short period of time, some spaces are frequently missed.

Thus, there is a need for an automated system that can efficiently and safely position food in proper alignment with a stick loading device and then automatically insert the stick into the food.

SUMMARY OF THE INVENTION

A hot dog loading machine of the present invention automatically loads hot dogs onto a conveyor in the proper alignment for stick insertion. A bin is used for storing quantities of the hot dogs. The bin is positioned so that the hot dogs will roll towards a hot dog conveyor belt. The conveyor belt forms the downslope end of the bin. The conveyor has sections that are in the cross-section J-shaped. As the conveyor passes through the downslope end of the bin, a hot dog is rolled by gravity into each J-shaped section. The conveyor then carries the hot dogs onto a horizontal loading section where the next sequence occurs.

Concurrently with the hot dog loading sequence a stick loading and positioning cycle occurs. Sticks are gravity fed from a packing case into a receiving container. A stick conveyor passes through the receiving container allowing sticks to be inserted into individual slots on the conveyor. Rotating brushes are used to ensure that excess sticks are brushed off the conveyor.

After the prescribed number of hot dogs have been loaded along with a matching number of sticks, the two conveyors are driven so as to align the sticks with the hot dogs. At this point a plunger device is activated by an air cylinder which pushes the sticks through a stick clamp and into the center of the hot dog. The stick clamp, now holding sticks which have been inserted into hot dogs, is conveyed away for further processing by a device such as is found in U.S. Pat. No. 4,430,930 to Walser, assigned to Automated Food Systems, Inc., Feb. 14, 1984.

BRIEF DESCRIPTION OF THE DRAWINGS

For a more complete understanding of the present invention and for further advantages thereof, reference is now made to the following description of the preferred embodiment taken in conjunction with the accompanying drawings in which:

FIG. 1 is a side perspective view of the present invention including its associated devices;

FIG. 2 is a side view of the hot dog loading position showing the bin and the conveyor;

FIG. 3 is a side view of the hot dog conveyor centering sprocket;

FIG. 4 is a side view of a stick remover;

FIG. 7 is a block diagram depicting the sequence by which the counting means of the present invention causes the motor of the present invention to start and stop; and FIG. 8 is a side view of the present invention showing the orientation of the counting means.

DESCRIPTION OF THE PREFERRED EMBODIMENTS

Figure 5:
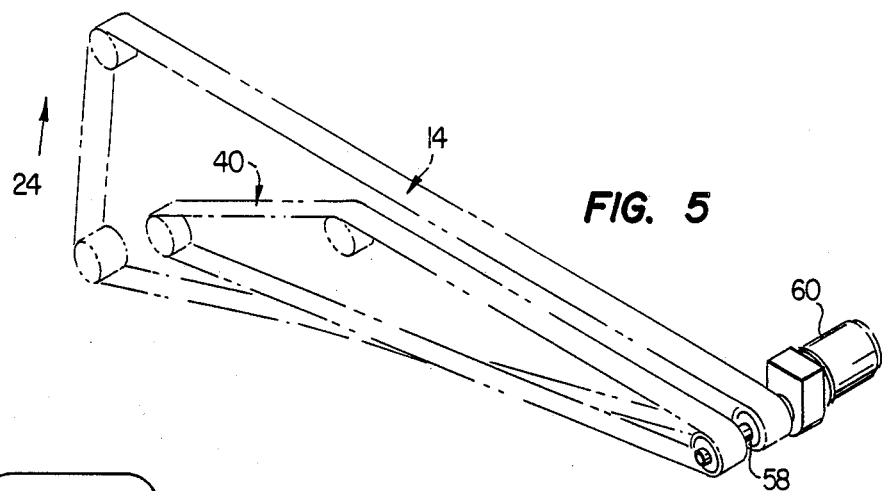
FIG. 5 is schematic perspective view of the hot dog conveyor and the stick conveyor with the drive motor in place.

Referring to FIG. 1, an apparatus for loading hot dogs for alignment with sticks is generally identified by reference numeral 10. A hot dog receiving bin 12 is mounted to the apparatus 10. A continuous loop hot dog conveyor belt 14 forms end 16 of receiving bin 12. Receiving bin 12 is positioned so that bottom portion 18 slopes downward from the horizontal toward continuous loop belt 14. This slope allows a hot dog to roll by gravity toward belt 14.

Hot dog conveyor belt 14 can be constructed of any suitable material such as steel or plastic. In a preferred embodiment belt 14 is attached to a stainless steel link drive chain 20 (See FIG. 3). Belt 14 has J-shaped sections 22 (FIG. 2) when seen in the cross-section. As belt 14 travels in the direction of arrows 24 a hot dog 26 is rolled into J-shaped section 22. J-shaped section 22 holds hot dog 26 so that it does not fall back into bin 12. Belt 14 continues to travel in the direction of arrows 24 until the correct number of hot dogs 26 are loaded and positioned for stick insertion.

Once belt 14 stops for stick insertion, a hot dog clamp bar 28 is pivoted so as to place clamp fingers 30 over hot dogs 26 (See FIGS. 1 & 4). An air cylinder 32 in its extended position as shown in FIGS. 1 & 4 places clamp fingers 30 over hot dogs 26. In its retracted position (not shown) cylinder 32 pivots clamp bar 28 so as to place clamp fingers 30 in a substantially vertical position. Fingers 30 are placed over hot dogs 26 to hold them securely against belt 14 during the stick insertion sequence as described below.

As belt 14 travels along the direction of arrows 24, it passes positioning roller 34. Roller 34 is provided to ensure that each hot dog 26 is positioned properly on J-shaped section 22.

Concurrently with the hot dog positioning cycle a stick positioning cycle occurs. Food sticks 36 are placed in a stick receiving container 38. A conveyor system 40 passes through container 38 allowing sticks 36 to be placed in stick slots 42. Conveyor system 40 is chain driven similarly to belt 14. Rotary brushes 44 are driven by brush motor 46 to allow no more than one food stick 36 per stick slot 42. After all stick slots 42 are filled and positioned to match the hot dogs on the hot dog conveyor belt 14, the food sticks 36 are inserted into the hot dogs 26. A proximity switch (counting means) is used to count the proper number of stick slots 42.

A stick insertion bar 48 is attached to an air cylinder 50. Fixedly attached to bar 48 are plunger shafts 52. Opposite bar 48 is a support bar 54 which plunger shafts 52 slideably pass through.

Plunger shafts 52 are arranged so as to coincide with food sticks 36 and stick slots 42 when sticks 36 are ready for insertion into hot dogs 26. When hot dogs 26 and sticks 36 are properly aligned, cylinder 50 is activated.

When cylinder 50 is activated, bar 48 and plunger shafts 52 are pushed toward conveyor 40. When cylinder 50 is fully extended, plunger shafts 52 have pushed sticks 36 through stick clamp 56 and into hot dogs 26.

Belt 14 and conveyor system 40 are simultaneously driven by a common drive shaft 58. (FIG. 3 and FIG. 5). Shaft 58 is in turn powered by electric motor 60. Electric motor 60 is provided with a brake system to prevent coasting.

Centering drive sprocket 62 and cylinder 64 (FIG. 3) are provided to ensure hot dogs 26 and sticks 36 are properly aligned with plunger shafts 52 for stick insertion. When belt 14 is stopped for the stick insertion sequence, cylinder 64 is activated. Plunger 65 is forced between the teeth of sprocket 62 to ensure precise positioning of belt 14 and conveyor system 40.

The hot dogs are then cycled through a process such as described in U.S. Pat. No. 4,379,795 to Walser, assigned to Automated Food Systems, Inc., April 12, 1983. Occasionally, an extra stick 66 remains inserted in stick clamp 56 (FIG. 4). It is thus necessary to remove this extra stick 66 to prevent it from jamming and shutting off the machine. A stick removal bar 68 is provided to perform this function. As stick clamp 56 returns to the stick insertion position as described above, it passes bar 68. Bar 68 is provided with grooves 70 that coincide with each stick on stick clamp 56. Grooves 70 are cut so that they are deeper into bar 68 where stick 66 first encounters it and becomes less deep forming a sloping surface toward bar 68. Any remaining stick 66 will encounter groove 70 and will be slid further into and flush with stick clamp 56. As stick clamp 56 passes belt 14 the extra stick 66 will either bend or break off. When a new stick 36 is pushed through stick clamp 56, the extra stick 66 is pushed out and drops harmlessly to the floor.

Figure 6:
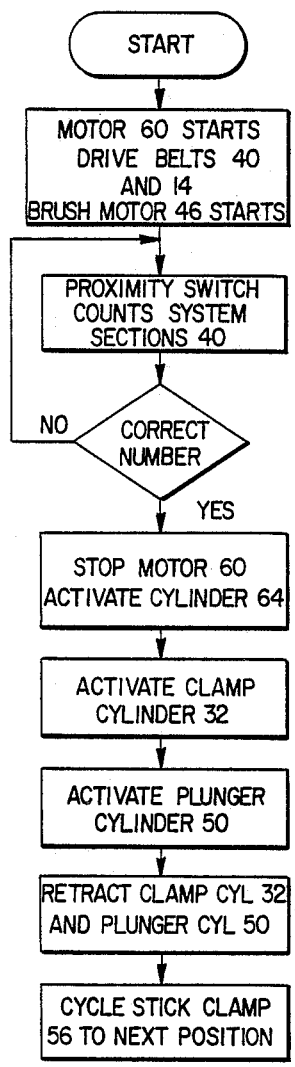
FIG. 6 is a flow diagram depicting the sequence of events during operation of the present invention.

All actions by apparatus 10 are controlled by an electrical microprocessor such as Allen-Bradley's SLC-100. The microprocessor and its related connections are installed in a control panel 80 (FIG. 1). The sequence of events as illustrated in FIG. 6 are as follows:

1. Motor 60 for drive belt 14 and system 40 is activated. Simultaneously, brush motor 46 is activated.

2. A proximity switch counts the number of food sticks retained by conveyor system 40 and generates a signal when the number of food sticks is equal to a predetermined number. This signal is received by an electronic signal processing means within the microprocessor which, upon receiving the signal, causes motor 60 to stop.

3. Cylinder 64 is activated to ensure proper alignment of hot dogs 26 and sticks 36 with plunger shafts 52.

4. Air cylinder 32 is activated to pivot clamp 30 into position to hold hot dogs 26 on belt 14.

5. Air cylinder 50 is activated to move plunger shafts 52 toward conveyor 40 and insert sticks 36 through stick clamp 56 and into hot dogs 26.

6. Simultaneously, cylinders 50 and 32 are retracted, moving plunger shafts 52 away from conveyor 40 and lifting clamp fingers 30 from hot dogs 26.

7. Stick clamp 56 is cycled to its next position.

Although the present invention has been described with respect to a specific preferred embodiment thereof, various changes and modifications may be suggested to one skilled in the art and it is intended that the present invention encompass such changes and modifications as fall within the scope of the appended claims.

I claim:

1. An automated food handling apparatus comprising:
    a first continuous belt having individual food accepting sections spaced about said belt;
    means for loading a food item on each of said food accepting sections;
    a second continuous belt parallel to said first belt, said second continuous belt having a first side opposite said first continuous belt and having individual food stick receiving slots spaced about said second belt such that each of said food accepting sections is aligned with each of said food stick accepting slots;
    means for loading a food stick on each of said food stick accepting slots;
    a predetermined number of food stick inserting members movably mounted on said apparatus;
    means for driving said first and said second belts in the same direction and at the same speed with said food accepting sections of said first belt aligned with said food stick accepting slots of said second belt;
    counting means for detecting when said drive means has positioned a number of food sticks opposite said food stick inserting members equal to a predetermined number of inserting members, including means for generating a signal when the number of food sticks equals said predetermined number;
    electronic signal processing means for controlling the starting and stopping of said drive means and being responsive to said signal generating means, such that said drive means is started to load and advance a number of said food sticks and food items and momentarily stopped responsive to receiving said signal generated by said signal generating means; and
    means for moving said food stick inserting members whereby said food stick inserting members drive each of the predetermined number of food sticks on said second belt into each of said food items on said first belt responsive to a signal from said electronic signal processing means, and whereby food items are automatically loaded onto food handling sticks.

2. The automated food handling apparatus of claim 1, further comprising a food positioning roller to properly align food on said individual food accepting sections prior to insertion of said sticks.

3. The automated food handling apparatus of claim 1, wherein said predetermined number of food stick inserting members is properly aligned with said sticks by a multi-toothed centering drive sprocket and an air cylinder with a plunger which is activated when said first continuous belt and said second continuous belt are stopped in position for stick insertion, whereby said plunger is forced between said sprocket teeth to properly align said individual food accepting sections and said sticks with said predetermined number of food stick inserting members.

4. The automated food handling apparatus of claim 1, further comprising a stick removal bar which prevents unwanted food sticks from jamming the machine.

5. The automated food handling apparatus of claim 1, wherein said means for said food stick inserting members to drive each of the predetermined number of said food sticks comprises:
   a stick clamp;
   a stick insertion bar;
   plunger shafts fixedly attached to said stick insertion bar;
   said plunger shafts being substantially horizontal and parallel to each other and spaced so as to coincide with said individual stick accepting slots;
   a stick insertion air cylinder attached to said stick insertion bar opposite said plunger shafts;
   a plunger shaft support bar with holes to allow said plunger shafts to slideably pass through;
   said plunger shaft support bar being located between said stick insertion bar and said individual stick accepting slots;
   said stick clamp being located between said individual stick accepting slots and said individual food accepting sections;
   a food clamp bar including food clamp fingers; and
   a food clamp air cylinder pivotally attached to said food clamp bar, whereby when the food clamp cylinder is activated it pivots the food clamp bar, bringing the food clamp fingers into contact with the food to hold it in place while the stick insertion cylinder is activated, moving the plunger shafts toward and into contact with the sticks and thus moving the sticks through the stick clamp and into the food.

6. The automated food handling apparatus of claim 1, wherein said means for loading a food item on each of said food accepting sections comprises:
   a food receiving bin;
   said food bin having a bottom, a food receiving end and a food exiting end;
   said food bin positioned so that said bottom slopes downward from the horizontal so that said exiting end is lower than said receiving end; and
   said first continuous belt passing through said exiting end so as to deposit a food item in said individual food accepting sections.

7. The automated food handling apparatus of claim 1, wherein said means for loading a food stick on each of said food stick accepting slots comprises:
   a stick receiving container; and
   said second continuous belt passing through said stick receiving container so as to deposit a stick in each individual stick accepting slot.

8. An automated food handling apparatus comprising:
   a food receiving bin;
   said food bin having a bottom, a food receiving end and a food exiting end;
   said food bin positioned so that said bottom slopes downward from the horizontal so that said exiting end is lower than said receiving end;
   a continuous loop food conveyor belt;
   said food belt including individual food accepting sections;
   said food conveyor belt passing through said exiting end of said food bin so as to deposit a food item in said individual food accepting sections;
   a continuous loop stick conveyor system;
   said stick conveyor system including individual stick accepting slots;
   a stick receiving container;
   said stick conveyor system passing through said stick receiving container so as to deposit a stick in said individual stick accepting slots;
   a drive means for said food conveyor belt and said stick conveyor system;
   said drive means constructed and arranged so as to provide alignment of said individual food accepting sections with said individual stick accepting slots;
   a means for inserting said sticks into said food items;
   counting means for detecting when said drive means has positioned a predetermined number of said food sticks opposite said means for inserting said sticks into said food items, including means for generating a signal when the number of food sticks equals said predetermined number;
   electronic signal processing means for controlling the starting and stopping of said drive means and being responsive to said signal generating means, such that said drive means is started to load and advance a number of said food sticks and food items and momentarily stopped responsive to receiving said signal generated by said signal generating means;
   a means for ensuring said means for inserting said sticks into said food items is properly aligned with said sticks which includes a multi-toothed centering drive sprocket and an air cylinder with a plunder which is activated when said food conveyor belt and said stick conveyor system is stopped in position for stick insertion, whereby said plunger is forced between said sprocket teeth to properly align said individual food accepting sections and said sticks with said means for inserting said sticks into said food; and
   a food positioning roller to properly align food on said individual food accepting sections prior to insertion of said sticks, whereby the food bin is loaded with food which is gravity fed into the individual food accepting sections as the food conveyor belt passes through the exiting end of the food bin, the sticks are simultaneously deposited into the individual stick accepting slots and the sticks are inserted into the food items.

9. The automated food handling apparatus of claim 8, further comprising a stick removal bar which prevents unwanted food sticks from jamming the machine.

10. The automated food handling apparatus of claim 8, wherein said means for inserting said sticks into said food items comprises:
   a stick clamp;
   a stick insertion bar;
   plunger shafts fixedly attached to said stick insertion bar;

said plunger shafts being substantially horizontal and parallel to each other and spaced so as to coincide with said individual stick accepting slots;

a stick insertion air cylinder attached to said stick insertion bar opposite said plunger shafts;

a plunger shaft support bar with holes to allow said plunger shafts to slideably pass through;

said plunger shaft support bar being located between said stick insertion bar and said individual stick accepting slots;

said stick clamp being located between said individual stick accepting slots and said individual food accepting sections;

a food clamp bar including food clamp fingers; and a food clamp air cylinder pivotally attached to said food clamp bar, whereby when the food clamp cylinder is activated it pivots the food clamp bar, bringing the food clamp fingers into contact with the food to hold it in place while the stick insertion cylinder is activated, moving the plunger shafts toward and into contact with the sticks and thus moving the sticks through the stick clamp and into the food.

11. An automated food handling apparatus comprising:

a food receiving bin;

said food bin having a bottom, a food receiving end and a food exiting end;

said food bin positioned so that said bottom slopes downward from the horizontal so that said exiting end is lower than said receiving end;

a continuous loop food conveyor belt;

said food belt including individual food accepting sections;

said food conveyor belt passing through said exiting end of said food bin so as to deposit a food item in said individual food accepting sections;

a continuous loop stick conveyor system;

said stick conveyor system including individual stick accepting slots;

a stick receiving container;

said stick conveyor system passing through said stick receiving container so as to deposit a stick in said individual stick accepting slots;

a drive means for said food conveyor belt and said stick conveyor system;

said drive means constructed and arranged so as to provide alignment of said individual food accepting sections with said individual stick accepting slots;

a means for inserting said sticks into said food items comprising:

a stick clamp;

a stick insertion bar;

plunger shafts fixedly attached to said stick insertion bar;

said plunger shafts being substantially horizontal and parallel to each other and spaced so as to coincide with said individual stick accepting slots;

a stick insertion air cylinder attached to said stick insertion bar opposite said plunger shafts;

a plunger shaft support bar with holes to allow said plunger shafts to slideably pass through;

said plunger shaft support bar being located between said stick insertion bar and said individual stick accepting slots;

said stick clamp being located between said individual stick accepting slots and said individual food accepting sections;

a food clamp bar including food clamp fingers; and a food clamp air cylinder pivotally attached to said food clamp bar, whereby when the food clamp cylinder is activated it pivots the food clamp bar, bringing the food clamp fingers into contact with the food to hold it in place while the stick insertion cylinder is activated, moving the plunger shafts toward and into contact with the sticks and thus moving the sticks through the stick clamp and into the food;

counting means for detecting when said drive means has positioned a predetermined number of said food sticks opposite said means for inserting said sticks into said food items, including means for generating a signal when the number of food sticks equals said predetermined number;

electronic signal processing means for controlling the starting and stopping said drive means and being responsive to said signal generating means, such that said drive means is started to load and advance a number of said food sticks and food items and momentarily stopped responsive to receiving said signal generated by said signal generating means;

a means for ensuring said means for inserting said sticks into said food items is properly aligned with said sticks which includes a multi-toothed centering drive sprocket and an air cylinder with a plunger which is activated when said food conveyor belt and said stick conveyor system is stopped in position for stick insertion, whereby said plunger is forced between said sprocket teeth to properly align said individual food accepting sections and said sticks with said means for inserting said sticks into aid food; and a food positioning roller to properly align food on said individual food accepting sections prior to insertion of said sticks, whereby the food bin is loaded with food which is gravity fed into the individual food accepting sections as the food conveyor belt passes through the exiting end of the food bin, the sticks are smultaneously deposited into the individual stick accepting slots and the sticks are inserted into the food items.

* * * * *